United States Patent
Fernandez Cahuantzi (10) Patent No.: US 11,703,090 B2
(45) Date of Patent: Jul. 18, 2023

(54) VEHICLE DRIVETRAIN SYSTEM WITH A DUAL WALL BOOT

(71) Applicant: NISSAN NORTH AMERICA, INC., Franklin, TN (US)

(72) Inventor: Javier Fernandez Cahuantzi, Estado de México (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 502 days.

(21) Appl. No.: 16/800,931

(22) Filed: Feb. 25, 2020

(65) Prior Publication Data

US 2021/0262530 A1    Aug. 26, 2021

(51) Int. Cl.
*F16D 3/84* (2006.01)
*F16J 3/04* (2006.01)

(52) U.S. Cl.
CPC .............. *F16D 3/845* (2013.01); *F16J 3/041* (2013.01); *F16J 3/042* (2013.01)

(58) Field of Classification Search
CPC .............. F16J 3/042; F16J 3/041; F16D 3/845
See application file for complete search history.

(56) References Cited

U.S. PATENT DOCUMENTS

| | | | | |
|---|---|---|---|---|
| 1,885,121 A | * | 11/1932 | Loweke | B60T 11/165 |
| | | | | 137/859 |
| 3,381,987 A | * | 5/1968 | Roberta | F16C 11/0671 |
| | | | | 277/635 |
| 4,573,693 A | | 3/1986 | Nakata et al. | |
| 5,222,746 A | * | 6/1993 | Van Steenbrugge | F16J 3/045 |
| | | | | 403/50 |
| 6,056,297 A | * | 5/2000 | Harkrader | F16J 3/041 |
| | | | | 403/50 |
| 6,179,717 B1 | | 1/2001 | Schwarzler | |
| 8,888,132 B2 | * | 11/2014 | Allen | B62D 1/16 |
| | | | | 277/634 |
| 9,147,571 B2 | * | 9/2015 | Takahashi | H01L 21/00 |
| 10,385,972 B2 | | 8/2019 | Eschtruth | |
| 10,780,756 B1 | * | 9/2020 | Reiff | F16C 11/0671 |
| 2005/0250586 A1 | * | 11/2005 | Yamada | F16J 15/3224 |
| | | | | 464/170 |
| 2006/0199653 A1 | * | 9/2006 | Terashima | B60R 13/02 |
| | | | | 464/173 |
| 2008/0231003 A1 | * | 9/2008 | Moriyama | F16J 3/041 |
| | | | | 277/636 |
| 2016/0208918 A1 | * | 7/2016 | Dunning | F16D 3/845 |
| 2019/0170251 A1 | * | 6/2019 | Larson | F16J 3/041 |

FOREIGN PATENT DOCUMENTS

| | | | | | |
|---|---|---|---|---|---|
| JP | 08202466 A | * | 8/1996 | ............ | B60K 20/04 |
| JP | 2000199569 A | * | 7/2000 | ............ | B60R 13/06 |
| JP | 2008232302 A | | 10/2008 | | |

* cited by examiner

*Primary Examiner* — Eugene G Byrd
(74) *Attorney, Agent, or Firm* — Global IP Counselors, LLP (57) ABSTRACT

A vehicle drivetrain includes a driveshaft, a driveshaft joint and a boot. The driveshaft joint is configured to be coupled to an end of the driveshaft. The boot is disposed over the driveshaft joint. The boot has an inner wall and an outer wall. The inner and outer walls are separated by an empty space.

12 Claims, 6 Drawing Sheets

VEHICLE DRIVETRAIN SYSTEM WITH A DUAL WALL BOOT

BACKGROUND

Field of the Invention

The present invention generally relates to a boot for a vehicle driveshaft. More specifically, the present invention relates to a boot for a vehicle driveshaft.

Background Information

Vehicle drivetrains can include one or more dust boots provided to protect one or more vehicle driveshafts from premature wear or corrosion. Boots typically have annular folds extending between collars of the boot at opposite ends of the boot. The collar adjoin the boot to other components of the drivetrain, such as a driveshaft or a universal joint. Dust boots are designed and configured to protect the components of a drivetrain's universal joints from outside contaminants, and to enclose lubricant inside the dust boot.

SUMMARY

In view of the state of the known technology, one aspect of the present disclosure is to provide a vehicle drivetrain comprising a driveshaft, a driveshaft joint and a boot. The driveshaft joint is configured to be coupled to an end of the driveshaft. The boot is disposed over the driveshaft joint. The boot has an inner wall and an outer wall. The inner and outer walls are separated by an empty space.

In view of the state of the known technology, another aspect of the present disclosure is to provide a boot for a driveshaft joint of a vehicle drivetrain, comprising an inner wall and an outer wall. The inner and outer walls are separated by an empty space.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
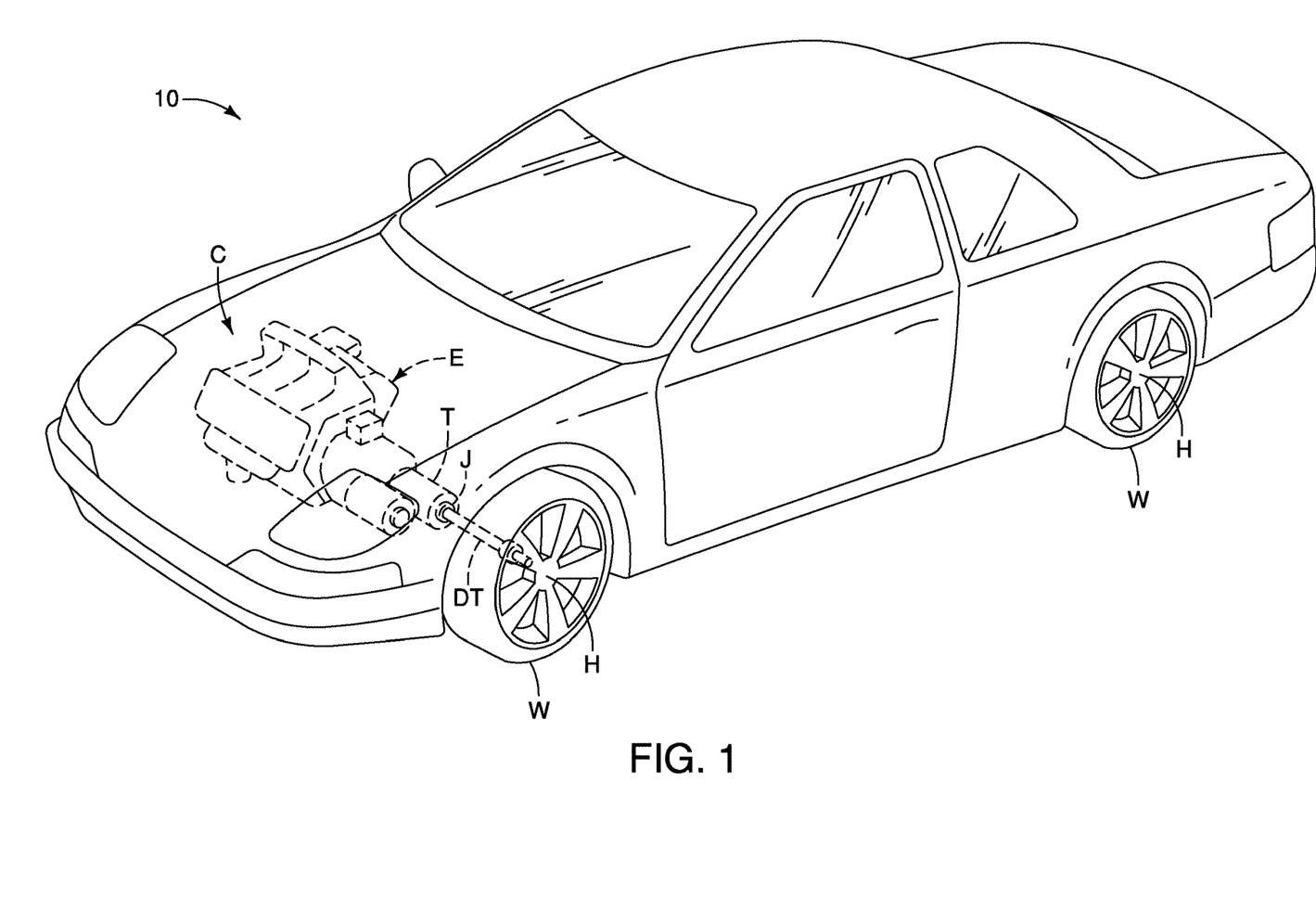
FIG. 1 is a perspective view of a vehicle equipped with a conventional drivetrain disposed between and engine and a wheel hub assembly.
Figure 2:
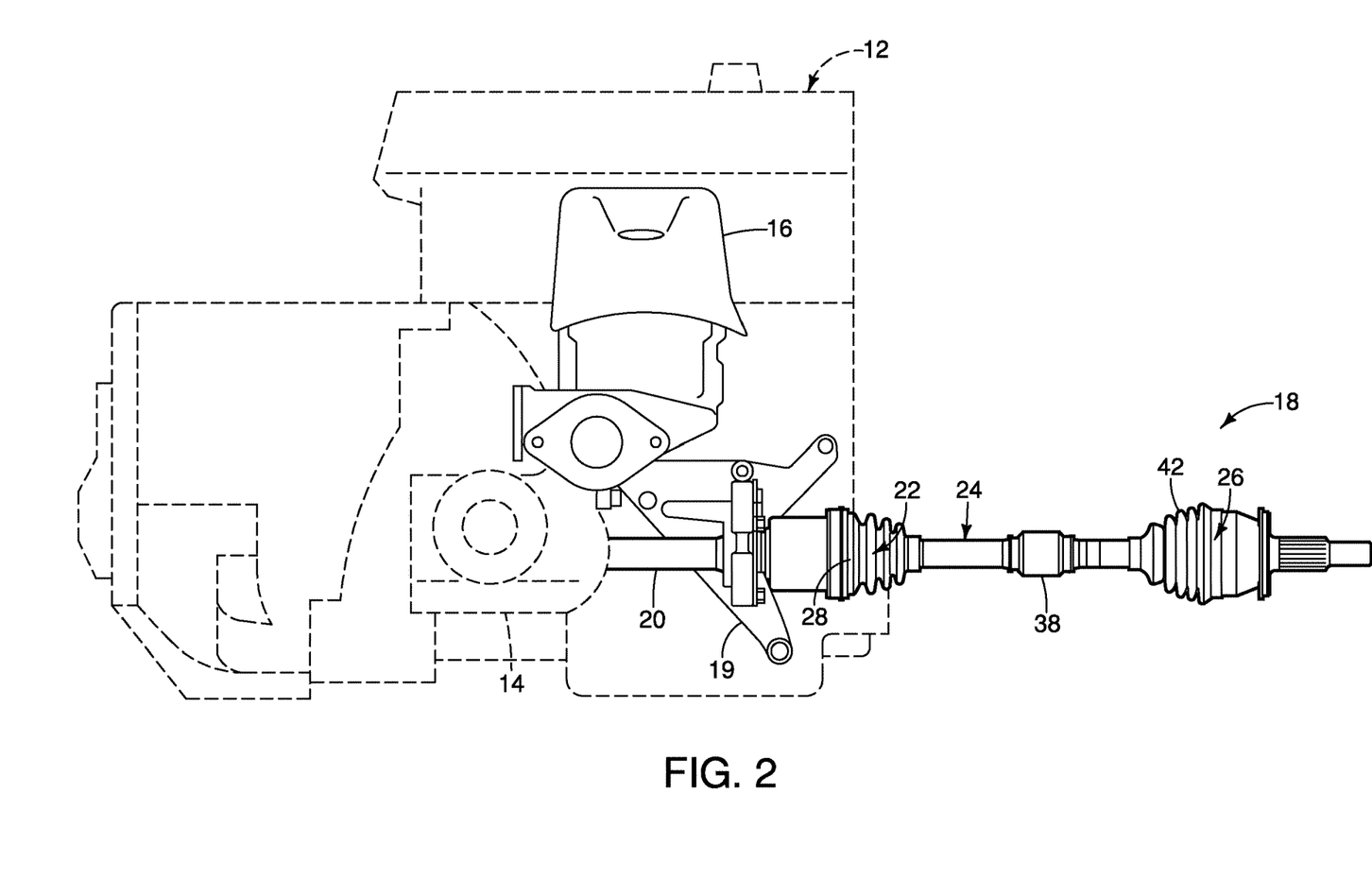
FIG. 2 is a plan view of an engine and a drivetrain of the illustrated embodiment that can be implemented with the vehicle of FIG. 1.

Referring initially to FIG. 1, a vehicle 10 having an engine compartment C is illustrated. The vehicle 10 of FIG. 1 is illustrated as being equipped with a generic engine E, transmission T and a drivetrain DT for transferring power between the engine E and a wheel hub assembly H of the vehicle 10. The drivetrain 18 of FIG. 1 is illustrated as having a universal joint J. Referring to FIG. 2, an engine 12, a transmission 14 and an emissions control system 16 (e.g., a maniverter exhaust system or maniverter) that can be implemented into the engine compartment C of the vehicle 10 is illustrated in accordance with an illustrated embodiment. Additionally, a vehicle drivetrain 18 to be positioned between the transmission 14 and the wheel hub assembly H is illustrated in FIG. 2. The drivetrain 18 is positioned to transfer torque from the engine 12 to the drive wheels W of the vehicle 10.

That is, the engine 12, the transmission 14 and the drivetrain 18 of FIG. 1 can be replaced with the engine 12, the transmission 14 and the drivetrain 18 of the illustrated embodiment in FIG. 2. Therefore, the vehicle 10 can be equipped with the transmission 14 and the drivetrain 18 of the illustrated embodiment in FIG. 2. The transmission 14 is interconnected with the emissions control system 16 to adjust engine timing and air-to-fuel ratios to reduce exhaust emissions. The transmission 14 is a speed-changing device installed in the power train between the engine 12 and the drive wheels W of the vehicle 10. In particular, the transmission 14 is installed between the engine 12 and the wheel hub assembly H of the vehicle 10.

The drivetrain 18 couples the engine 12 that produces the power for driving the vehicle 10 and transfers the power to the drive wheels W as mechanical power to rotate the wheel axles. In particular, power is conveyed from the transmission 14 to the drive wheels W by one or more drive axles and one or more universal joints of the drivetrain 18. In this way, the drivetrain 18 is configured and positioned to allow longitudinal movement in order to compensate for the vehicle's 10 tolerances. At the same time, the drivetrain 18 is configured to allow for angular movement during use to absorb the motion of the vehicle's 10 suspension (not shown). As seen in FIG. 2, the drivetrain 18 is supported to the engine 12 by a one or more trim parts. For example, the vehicle 10 can include a bracket 19 supporting the drivetrain 18 to the transmission 14 such that the drivetrain 18 is operatively connected to the transmission 14. The bracket 19 is fixed to the engine 12 by retainers or bolts in a conventional manner.

In the illustrated embodiment, the drivetrain 18 comprises a pair of driveshafts or axles and a pair of driveshaft joints that are universal joints. In particular, drivetrain 18 comprises a longstem 20 that is an axle configured to be supported to the transmission 14. The drivetrain 18 further includes a driveshaft joint 22 that is coupled to the longstem 20. The driveshaft joint 22 of the illustrated embodiment is a constant velocity joint 22.

The vehicle 10 drivetrain 18 further comprises a barshaft 24 and a fixed joint 26 that are downstream of the longstem 20. The constant velocity joint 22 is also coupled to the barshaft 24 to transfer torque from the longstem 20 to the barshaft 24. In the illustrated embodiment, the longstem 20 and the barshaft 24 are driveshafts of the drivetrain 18. The fixed joint 26 is configured to be joined to the wheel hub assembly to transfer torque from the engine 12 to the drive wheels W. The drivetrain 18 further includes a boot 28 disposed over the constant velocity joint 22 to protect the components of the constant velocity joint 22. In the illustrated embodiment, the boot 28 is exposed to the heat radiated by the maniverter 16 which can damage the boot 28 and the grease of the inside of the constant velocity joint 22.

Conventionally, a heat plate is installed between the boot 28 and the maniverter 16 to avoid damage to the boot 28 and other components of the drivetrain 18. However, in the illustrated embodiment, the boot 28 has a double-wall arrangement that eliminates need for the heat plate. In particular, the double-wall arrangement of the boot 28 enables the boot 28 provided to the constant velocity joint 22 to dissipate heat from the boot 28 without the need for the heat shield. The boot 28 will be further discussed below.

Figure 3:
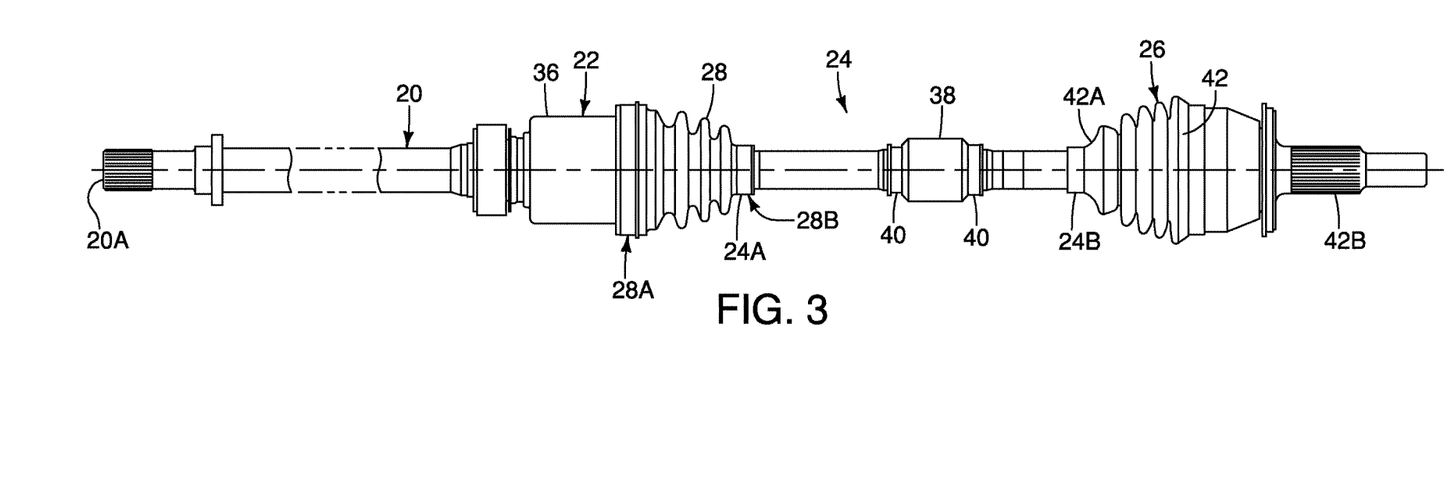
FIG. 3 a plan view of the drivetrain of FIG. 2.
Figure 4:
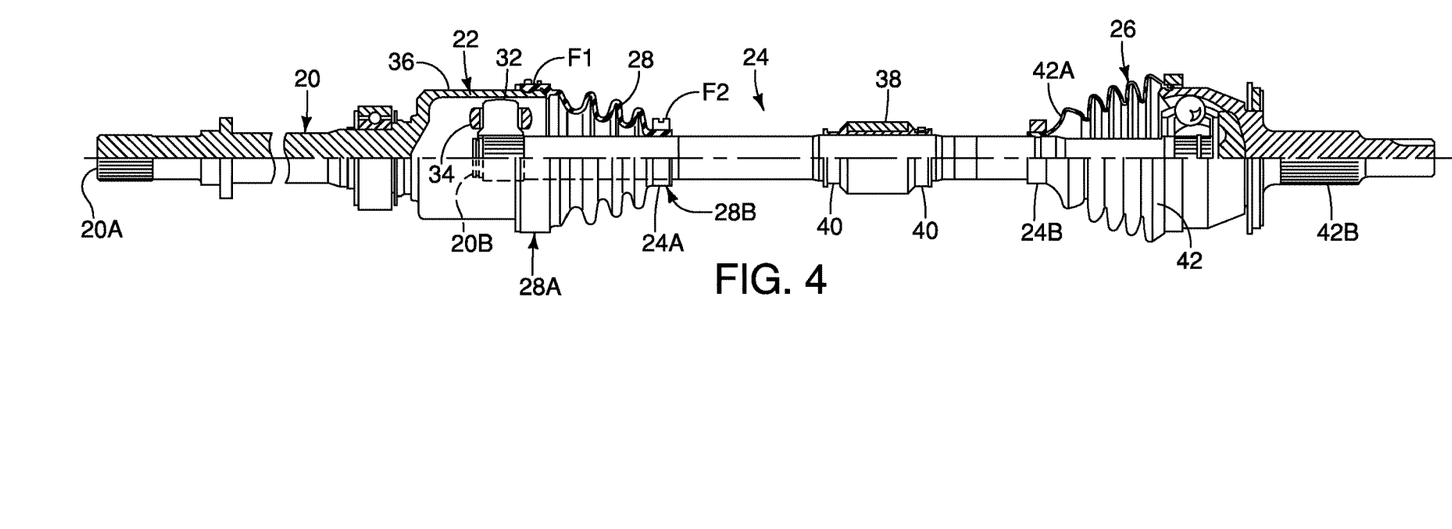
FIG. 4 is a plan view of the drivetrain of FIG. 3 with portions of the drivetrain in cross-section.

Referring to FIGS. 2 to 4, the longstem 20 is a rigid metal axle preferably made of stainless steel. The longstem 20 supports the drivetrain 18 to the bracket 19. During use, the longstem 20 allows angular movement of the drivetrain 18 to absorb suspension motion of the vehicle 10. The movement of the longstem 20 also transfers torque from the maniverter 16 to the barshaft 24. The longstem 20 also operates to transfer torque from the engine 12 to the constant velocity joint 22. As best seen in FIGS. 3 and 4, the longstem 20 includes a first end 20A (e.g., an upstream end) that is coupled to the transmission 14 and a second end 20B (e.g., a downstream end) that is coupled to the constant velocity joint 22. The longstem 20 is sized and dimensioned to have a length that accommodates the distance between the engine 12 and the wheel hub assembly H to avoid torque oversteer.

The constant velocity joint 22 is coupled to the second end 20B of the longstem 20 such that the constant velocity joint 22 is disposed between the longstem 20 and the barshaft 24. In other words, the constant velocity joint 22 is disposed at an inboard end of the drivetrain 18 with respect to the fixed joint 26. The constant velocity joint 22 of the illustrated embodiment is also known as homokinetic or a CV joint. The constant velocity joint 22 allows the drivetrain 18 to transmit power through a variable angle, at constant rotational speed, without an appreciable increase in friction or play. Therefore, the constant velocity joint 22 maintains drive to the drive wheels W while accommodating movement of the drivetrain 18 due to suspension and steering articulation.

Figure 5:
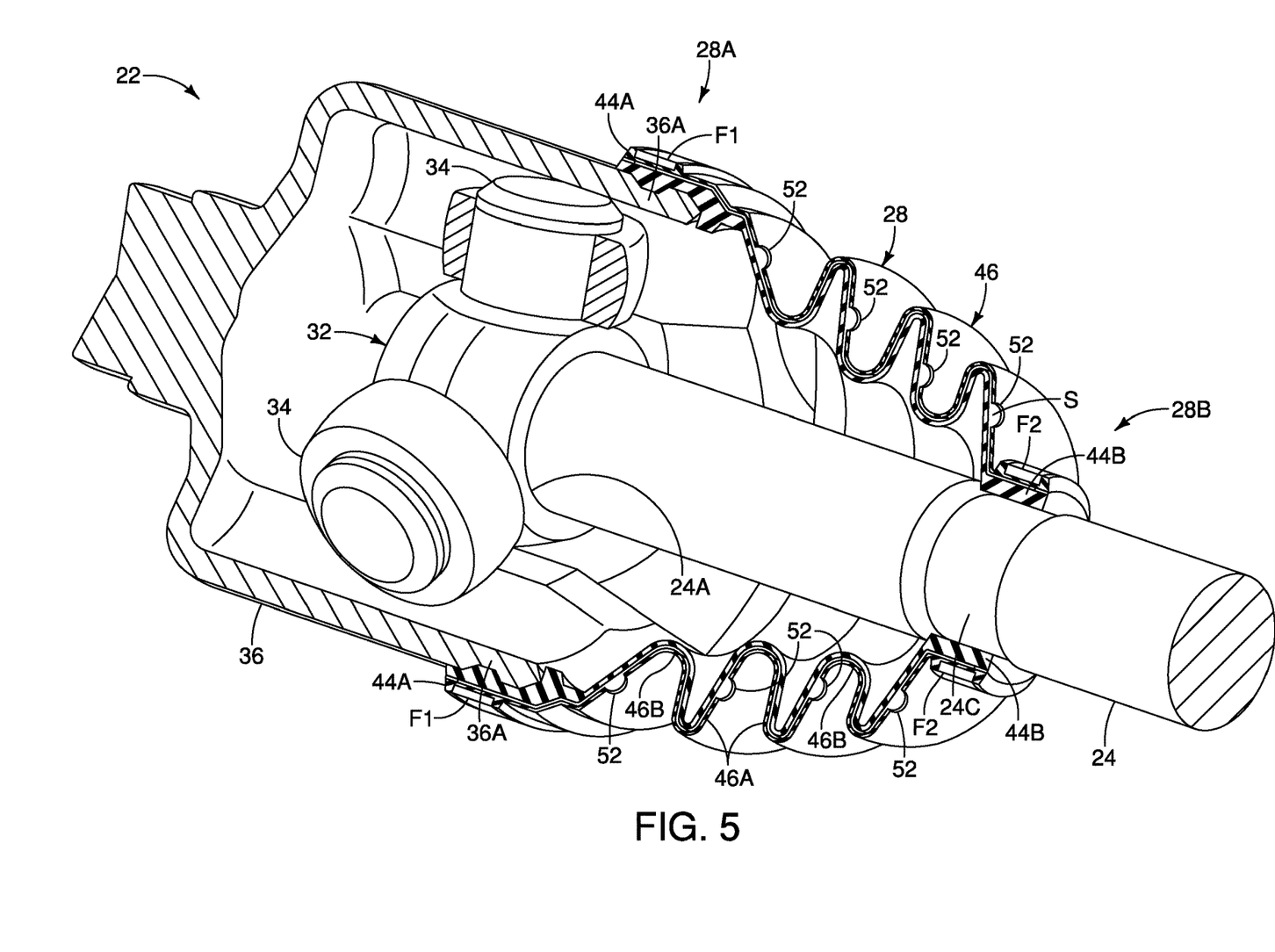
FIG. 5 is a cross-sectional view of a dust boot of the drivetrain disposed over a universal joint of the drivetrain.

As best seen in FIG. 5, the constant velocity joint 22 has a three-pointed yoke 32 (a tripod) that is attached to the longstem 20. The constant velocity joint 22 further includes barrel-shaped roller bearings 34 on the ends of the yoke 32. In particular, the constant velocity joint 22 includes three barrel-shaped roller bearings 34 at the ends of the yoke 32. The constant velocity joint 22 also has an outer race 36 that is a housing for the roller bearings 34. The outer race 36 is a spherical housing that is fixed to the longstem 20 and is driven by the movement of the longstem 20. The outer race 36 receives torque from the longstem 20 and transfers torque from the longstem 20 to the roller bearings 34. The roller bearings 34 enable the sliding and angular motion of the yoke 32 to receive torque transferred from the outer race 36 to the yoke 32. The yoke 32 then transfers torque from the roller bearings 34 to the barshaft 24. The constant velocity joint 22 is provided with grease and lubrication to protect the components during use and dissipate heat from the maniverter 16.

The barshaft 24 is a rigid metal axle that transfers torque from the constant velocity joint 22 to the fixed joint 26. As best seen in FIGS. 4 and 5, the barshaft 24 has a first end 24A (e.g., upstream end) coupled to the constant velocity joint 22 and a second end 24B (e.g., downstream end) coupled to the fixed joint 26. The barshaft 24 preferably includes a dynamic damper 38 to attenuate vibrations within the drivetrain 18 during use. As shown, the damper 38 is fixed to the barshaft 24 axle by a pair of clamps 40. The fixed joint 26 transfers torque from the barshaft 24 to the wheel hub assembly H at the same speed of rotation. The fixed joint 26 also allows angular movement of the drivetrain 18 to absorb suspension motion. Thus, the fixed joint 26 is coupled between the barshaft 24 and the wheel hub assembly H. In the illustrated embodiment, the fixed joint 26 is also a universal joint such as a constant velocity joint.

The drivetrain 18 further includes a fixed joint boot 42 that is disposed over the fixed joint 26 to protect the components of the fixed joint 26 and to keep lubrication inside the fixed joint 26. In the illustrated embodiment, the drivetrain 18 includes the 22 for the constant velocity joint 22 and the fixed joint boot 42 for the fixed joint 26. In the illustrated embodiment, only the boot 28 for the constant velocity joint 22 includes a double-wall arrangement as the boot 28 is arranged closer to the maniverter 16 and is more subject to heat damage from the proximity to the maniverter 16. However, it will be apparent to those skilled in the vehicle field from this disclosure that each of the boots 28 and 42 of the drivetrain 18 can have a double-wall arrangement to protect the components of the constant velocity joint 22 and the fixed joint 26, as needed and/or desired.

Referring to FIG. 5, the boot 28 is disposed over the constant velocity joint 22. The boot 28 is preferably a flexible or elastic boot 28 that protects the constant velocity joint 22. In the illustrated embodiment, the boot 28 is made of rubber. However, it will be apparent to those skilled in the vehicle field from this disclosure that the boot 28 can alternatively be made of flexible plastic. The boot 28 is alternatively called a CV gaiter or a CV boot that is a flexible sheath enclosing the constant velocity joint 22. The boot 28 keeps water and dirt out of the constant velocity joint 22 and the lubricant inside the constant velocity joint 22. The boot 28 is filled with lubricant such as molybdenum disulfide grease to protect the components of the constant velocity joint 22 inside the outer race 36. Cracks and splits in the boot 28 will allow contaminants in, which would cause the constant velocity joint 22 to wear quickly as lubricant leaks out. If the boot 28 is fractured, the exposed lubricant can be slung out by centrifugal force as the constant velocity joint 22 rotates, causing the constant velocity joint 22 to become subsequently become contaminated. As stated, the boot 28 of the illustrated embodiment is double-walled. That is, the boot 28 has an inner wall W1 and an outer wall W2. The boot 28 is configured to dissipate heat through the heat exchange between a space S between the inner and outer walls W1 and W2 and air exterior of the boot 28. Further, the double-walled boot 28 can prevents leakage in the event of damage to the first wall because the second wall can keep lubricant inside the constant velocity joint 22.

As best seen in FIGS. 4 and 5, the boot 28 has a first end 28A that is coupled to the constant velocity joint 22 and a second end 28B that is coupled to the barshaft 24. In particular, the first end 28A of the boot 28 is coupled to the outer race 36 of the constant velocity joint 22. In other words, the boot 28 of the illustrated embodiment is configured to be fixed to the constant velocity joint 22 at the first end 28A (an upstream end) of the boot 28, and is configured to be fixed to the barshaft 24 at the second end 28B (a downstream end) of the boot 28.

As best seen in FIG. 5, the barshaft 24 includes an annular groove 24C near the proximity where the second end 28B of the boot 28 is fixed. The outer race 36 of the constant velocity joint 22 also includes an annular groove 36A at which the first end 28A of the boot 28 is fixed. The inner wall W1 of the boot 28 is shaped with ribs and contours to conform to the annular grooves 24C and 36A of the barshaft 24 and the outer race 36. Therefore, the boot 28 is shaped and dimensioned to enable a snug fit against the barshaft 24 and the constant velocity joint 22 to enclose the components of the constant velocity joint 22 and to prevent grease from escaping. It will be apparent to those skilled in the vehicle field from this disclosure that the boot 28 can be sized and configured to enclose the constant velocity joint 22 at other locations along the drivetrain 18, as needed and/or desired. Thus, it will be apparent to those skilled in the vehicle field from this disclosure that the diameter and size of the boot 28 can vary depending on the size of the constant velocity joint 22.

As best seen in FIG. 5, the vehicle 10 drivetrain 18 further comprises a first fastener F1 coupling the boot 28 to the outer race 36 at the first end 28A of the boot 28. The vehicle 10 drivetrain 18 further comprises a second fastener F2 coupling the boot 28 to the barshaft 24 at the second end 28B of the boot 28. In the illustrated embodiment, the first and second fasteners F1 and F2 are clamps removably clamping the boot 28 to the constant velocity joint 22 and the barshaft 24, respectively. It will be apparent to those skilled in the vehicle field from this disclosure that the first and second fasteners F1 and F2 can be alternative forms of retainers and fastening members as needed and/or desired.

Figure 6:
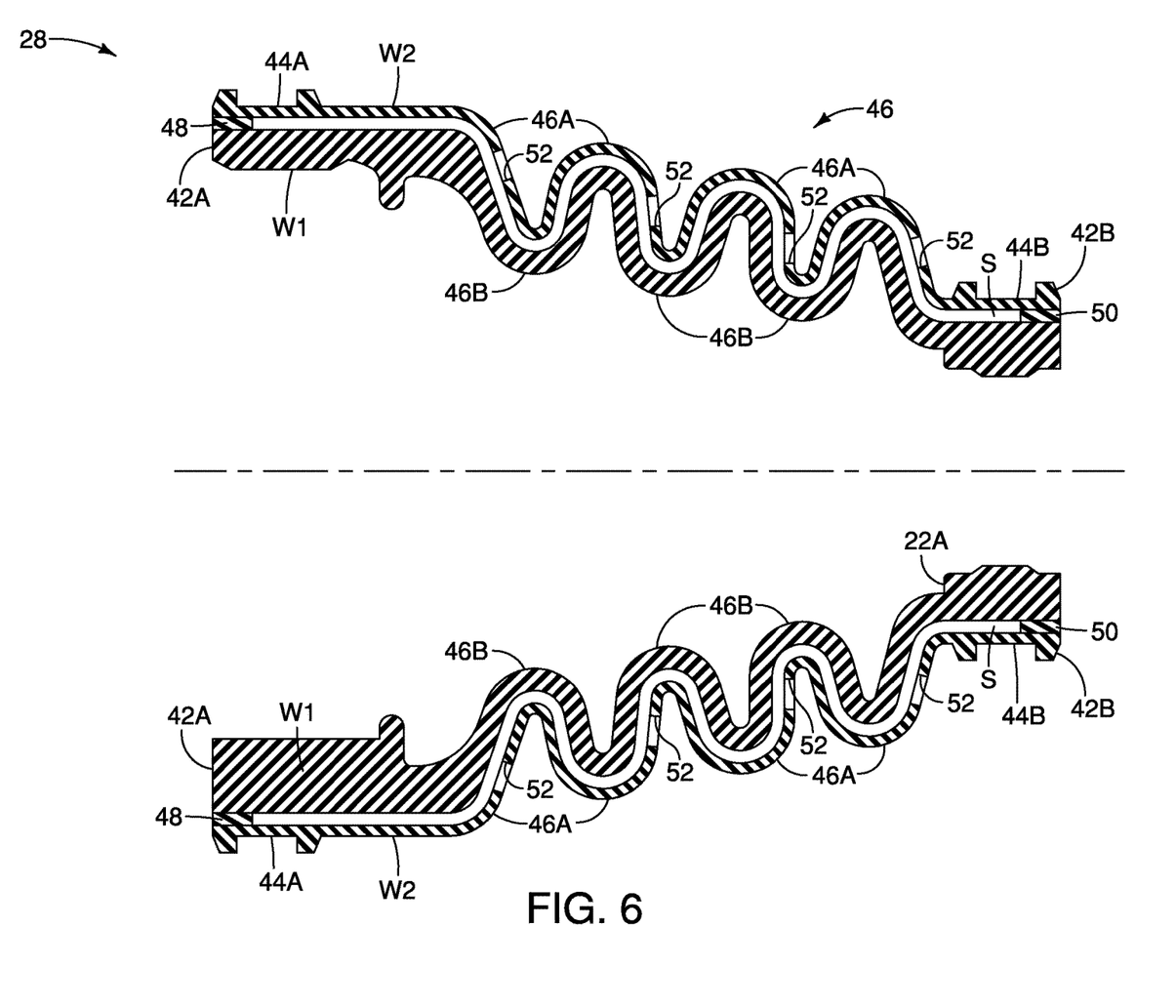
FIG. 6 is a cross-sectional view of the dust boot of FIG. 5.

As best seen in FIGS. 5 and 6, the boot 28 includes a first collar 44A having a first depression and a second collar 44B having a second depression. The first fastener F1 is coupled to the boot 28 at the first depression. The second fastener F2 is coupled to the boot 28 at the second depression. In particular, the outer wall W2 includes the first collar 44A for receiving the first fastener F1 that couples the boot 28 to the constant velocity joint 22. The outer wall W2 includes the second collar 44B at the second end 28B for receiving the second fastener F2 that couples the boot 28 to the barshaft 24. The first and second collars 44A and 44B are annular depressions at the first and second ends 28A and 28B of the boot 28.

The boot 28 has a plurality of annular folds 46 extending between the first and second collars 44A and 44B. The inner and outer walls W1 and W2 each include a plurality of annular folds 46 extending between the first and second ends 28A and 28B. The annular folds 46 include peaks 46A separated by troughs 46B. As shown in FIGS. 5 and 6, the diameter of the boot 28 from the first collar 44A to the second collar 44B decreases, and the diameter of the peaks 46A decreases from the first collar 44A to the second collar 44B. Therefore, the basic shape of the boot 28 is conical.

Figure 7:
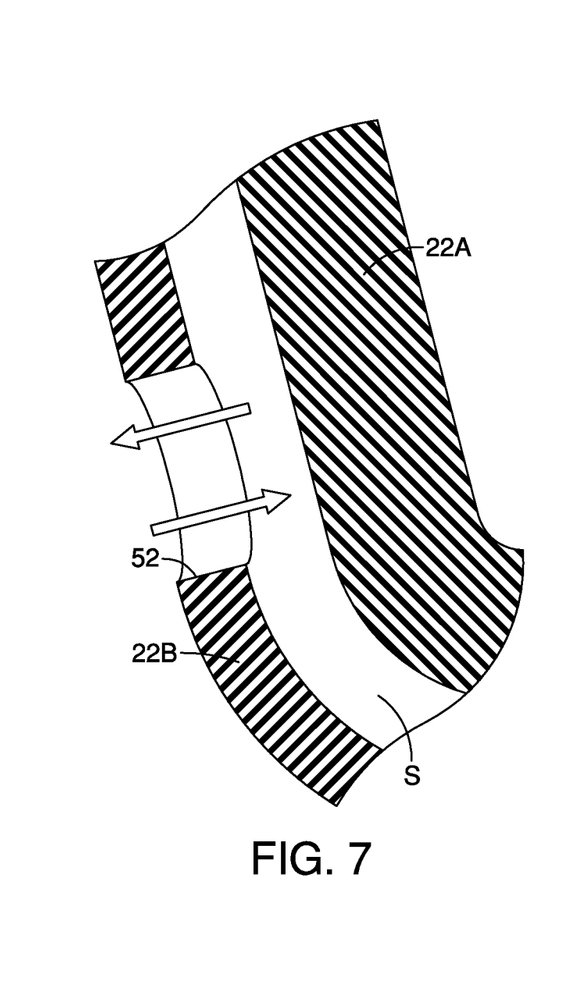
FIG. 7 is an enlarged view of a portion of the cross-sectional view of the dust boot of FIG. 6.

Referring to FIGS. 5 to 7, the inner and outer walls W1 and W2 are separated by the empty space S. That is, the inner and outer walls W1 and W2 are spaced from each other with empty air in between. As stated, the inner and outer walls W1 and W2 are elastic, preferably made of rubber or flexible plastic. As best seen in FIGS. 5 and 6, the boot 28 includes a first seal 48 disposed between the inner and outer walls W1 and W2 at the first end 28A of the boot 28 to seal the space S at the first end 28A. The boot 28 further includes a second seal 50 disposed between the inner and outer walls W1 and W2 at the second end 28B of the boot 28 to seal the space S at the second end 28B. The first and second seals 48 and 50 can be rubber caps or annular gaskets disposed at the first and second ends 28A and 28B.

During manufacturing, the inner and outer walls W1 and W2 are separately formed. For example, the inner and outer walls W1 and W2 can be integrally molded plastic or rubber. Thus, the inner and outer walls W1 and W2 are formed as separate pieces that are later coupled during assembly of the boot 28 to the drivetrain 18. The first and second seals 48 and 50 are installed to the first and second ends 28A and 28B of the boot 28. At the same time, the first and second fasteners F1 and F2 are provided to the first and second ends 28A and 28B of the boot 28 to fix the inner and outer walls W1 and W2 together to the constant velocity joint 22 and the barshaft 24 with the first and second seals 48 and 50 in place.

Figure 8:
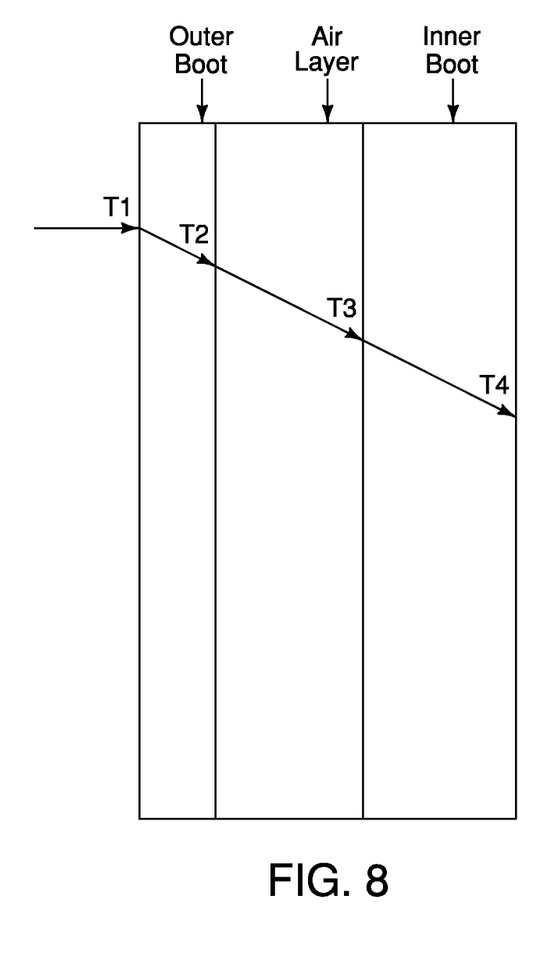
FIG. 8 is a schematic chart illustrated a temperature differential across the inner and outer walls of the dust boot.

As best seen in FIGS. 6 and 7, the boot 28 includes one or more openings 52. In particular, the outer wall W2 of the boot 28 includes one or more openings 52 dispersed throughout the outer wall W2. In particular, the openings 52 are preferably formed in the folds 46 of the outer wall W2 and between the troughs 46B and peaks 46A of the folds 46. However, it will be apparent to those skilled in the vehicle field from this disclosure that the openings 52 can be formed at various locations along the outer wall W2 of the boot 28, as needed and or necessary. It will also be apparent to those skilled in the vehicle field from this disclosure that the quantity and size of the openings 52 can vary with the size and shape of the boot 28. During use of the drivetrain 18, the boot 28 will expand and contract along the folds 46, causing air to enter and be expelled through the openings 52. Therefore, the openings 52 enable air exchange between the empty space S and an exterior environment of the boot 28. As a result, hot air is expelled and the expansion of the boot 28 and cooler ambient air would enter the empty space S, caused by a continuous air flow. Therefore, as seen in FIG. 8, a temperature of the outer wall W2 is to be greater than a temperature of the inner wall W1 as contraction and expansion of the boot dispels heat through the openings 52. As a result, the inner wall W1 is protected against heat erosion.

As best seen in FIG. 7, the inner wall W1 is more thick than the outer wall W2. In the illustrated embodiment, the thickness of the inner wall W1 will vary by the size and shape of the constant velocity joint 22. The outer wall W2 is thinner than the inner wall W1 to enable easier contraction and expansion of the outer wall W2 to expel air from the empty space S. In the illustrated embodiment, the inner wall W1 is preferably approximately twice as thick as the outer wall W2. Also in the illustrated embodiment, the inner and outer walls W1 and W2 are preferably spaced from each other by a distance that is substantially equivalent to the thickness of the inner wall W1.

General Interpretation of Terms

In understanding the scope of the present invention, the term "comprising" and its derivatives, as used herein, are intended to be open ended terms that specify the presence of the stated features, elements, components, groups, but do not exclude the presence of other unstated features, elements, components, groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the boot for the vehicle driveshaft. Accordingly, these terms, as utilized to describe the present invention should be interpreted relative to a vehicle equipped with the boot for the vehicle driveshaft.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle drivetrain comprising:
    a driveshaft;
    a driveshaft joint configured to be coupled to an end of the driveshaft, the driveshaft joint having an exterior wall defined by an outer race, the driveshaft joint further having roller bearings and a yoke, the roller bearings being disposed on the yoke, the outer race being a housing for the roller bearings; and
    a boot disposed over the driveshaft joint, the boot having an inner wall and an outer wall, the inner and outer walls being separated by an empty space, the inner and outer walls include a plurality of annular folds, the outer wall of the boot includes a plurality of openings formed in the annular folds of the outer wall to enable air exchange between the empty space and an exterior environment of the boot, the inner wall being installed to the exterior wall of the driveshaft joint at a position over the roller bearings, the boot including a first seal disposed between the inner and outer walls at a first end of the boot to seal the empty space at the first end, the boot further includes a second seal disposed between the inner and outer walls at a second end of the boot to seal the empty space at the second end.

2. The vehicle drivetrain according to claim 1, further comprising
    a longstem configured to be supported to a vehicle transmission, the driveshaft joint being coupled to an end of the longstem.

3. The vehicle drivetrain according to claim 2, wherein the driveshaft is a barshaft, the driveshaft joint being disposed between the longstem and the barshaft.

4. The vehicle drivetrain according to claim 1, further comprising
    a first fastener coupling the boot to the driveshaft joint at the first end of the boot.

5. The vehicle drivetrain according to claim 4, further comprising
    a second fastener coupling the boot to the barshaft at the second end of the boot.

6. The vehicle drivetrain according to claim 4, wherein the boot includes a first depression at the first end for receiving the first fastener.

7. The vehicle drivetrain according to claim 5, wherein the boot includes a second depression at the second end for receiving the second fastener.

8. A boot for a driveshaft joint of a vehicle drivetrain, comprising:
    an inner wall and an outer wall, the inner and outer walls being separated by an empty space, the inner and outer walls include a plurality of annular folds, the outer wall of the boot includes one or more openings formed in the annular folds of the outer wall to enable air exchange between the empty space and an exterior environment of the boot, the inner wall having a driveshaft joint attachment surface configured to contact an outer race of a driveshaft joint having roller bearings and a yoke, the roller bearings being disposed on the yoke, the outer race being a housing for the roller bearings;
    a first seal disposed between the inner and outer walls at a first end of the boot to seal the empty space at the first end, and
    a second seal disposed between the inner and outer walls at a second end of the boot to seal the empty space at the second end.

9. The boot according to claim 8, wherein the inner and outer walls are elastic.

10. The boot according to claim 8, wherein the boot is configured to be fixed to the driveshaft joint driveshaft at a first end of the boot, and is configured to be fixed to a driveshaft of the drivetrain at a second end of the boot.

11. The boot according to claim 8, wherein the outer wall includes first depression at the first end for receiving a first fastener that couples the boot to the driveshaft joint.

12. The boot according to claim 11, wherein the outer wall includes a second depression at the second end for receiving a second fastener that couples the boot to the driveshaft.

* * * * *